Patented Sept. 25, 1945

2,385,571

UNITED STATES PATENT OFFICE 2,385,571

MAKING N-SULPHONYLUREAS

Erich Haack, Radebeul, near Dresden, Germany; vested in the Alien Property Custodian No Drawing. Application December 7, 1940, Serial No. 369,118. In Germany December 15, 1939

2 Claims. (Cl. 260—397.7)

As a general rule urea derivatives of aromatic sulphonic acids which are substituted at the nitrogen cannot be prepared in the simple manner of a reaction of ureas upon sulphonylchlorides, as it is the case in obtaining the corresponding urea derivatives of the organic carboxylic acids. It is true that hydrogen chloride is split off during the reaction, if we attempt such a reaction between urea and sulphonylchloride; still we do not obtain the sulphonylurea, but merely sulphonic acids alongside of products derived from urea by splitting off water, or products of polymerisation thereof, such as dicyandiamide.

The desired N-sulphonylurea may be expressed by the formula:

wherein aryl is an unsubstituted or substituted aromatic nucleus or condensed aromatic system, and $R_1$ and $R_2$ are hydrogen, alkyl, aralkyl or aryl radicals.

This invention is based upon the surprising discovery, that a product of said formula may be readily and easily obtained by starting from N-sulphonylamides of the formula:

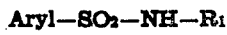

and by subjecting them to a treatment by the same methods which are commonly used for converting amides into ureas. The agents used in these methods are cyanic acid, isocyanic acid in the form of its esters, or compounds which change during the reaction into cyanic or isocyanic acid or from which these compounds are split off, e. g. nitrourea, urea, urethane and the like. Since the reaction is comparable to that of amines, it is more particularly rendered surprising by the acid character of the sulphamides on account of which salts of the cyanic acid or of the nitrourea may also be used, or basic compounds or acid binding salts like carbonate of soda may be present. In that case and provided also that a hydrogen atom is linked to the nitrogen atom neighbouring the sulphonyl group, the salts of the N-sulphonylureas, which react substantially neutral in watery solution, may be immediately obtained.

In the end these reactions take place according to the following formulae:

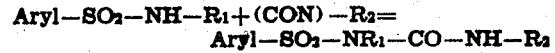

In case $R_1$ is hydrogen, and potassium cyanate is the cyanic acid derivative used, the following course of reaction may be suggested:

(1) $Aryl-SO_2-NH_2 + KOCN =$
$Aryl-SO_2-NK-CO-NH_2$

For nitrourea-sodium:

(2) 

For urethane:

(3) 

wherein alkyl stands for an alkyl-radical.

For urea:

(4) 

For isocyanic acid ester:

(5) 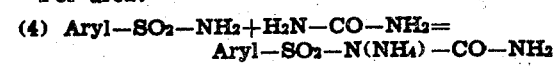

Generally speaking the reaction is preferably carried out under heat, e. g. at temperatures between 60°–100° C.

If the resulting N-sulphonylureas still carry hydrogen at the nitrogen atom which adjoins the sulphonyl group, they are strongly acid compounds which yield neutral alkali salts and are therefore most readily soluble in soda. If that is not the case, they are neutral compounds.

Compounds of this invention may be used for technical as well as medicinal purposes. Of particular value are compounds, which have an amino group in p-position to the $SO_2$-group on the aromatic sulphonyl nucleus and also carry a hydrogen atom on the nitrogen atom which is linked to the sulphonyl radical. These compounds serve as remedies for infectious diseases. The amino group may either be present as such, as illustrated by Example 7, or it may be introduced as an acylated group together with the sulphonic acid component (Examples 3 to 6) to be subsequent made free by saponification, or as a nitro-group, which is reduced to an amino group after the urea compound has been prepared.

Example 1

50 gr. of benzenesulphamide and 28 gr. of potassium cyanate are boiled in alcohol (80–90%), until a test shows complete solubility in water. That means that the potassium salt of the benzenesulphonylurea has been formed, which may be recrystallized as such from water, possibly under addition of potassium carbonate in order to reduce the solubility. When dissolved in water and acidulated by glacial acetic acid, the free benzenesulphonylurea is precipitated with a yield of about 90% and shows, when dry, a melting point of 170–171° C.

Example 2

50 gr. of p-toluenesulphamide and 25 gr. of nitro-urea-sodium are gently heated in alcohol (80–90%) until the evolution of nitrous oxide is completed. The alcohol is distilled off and the residue is placed into a liberal amount of water, neutralized by carbonate of soda and filtered under suction off the starting material which has remained undissolved. A yield of approximately 80% of p-toluene-sulphonyl-N-urea crystallizes out of the filtrate after acidulation. The rest may be recovered as starting material from the portion which is not soluble in alkaline solution. By increasing the quantity of nitrourea the yield may be substantially improved. Purification of the toluenesulphonylurea is preferably brought about by crystallization of the potassium salt from a small qauntity of water to which potassium carbonate is added. The beautiful crystals may be dissolved in water and the free urea may be precipitated from the solution by acetic acid. It decomposes when melted at 184°–188° C.

Example 3

50 gr. of acetylsulphanilamide and 30 gr. of potassium cyanate are heated several hours in 200 cc. of alcohol and 20 cc. of water. Upon cooling the reaction product is sucked off and weighs 70–71 gr., after drying. This represents a substantially 100% yield of the potassium salt of the p-acetylsulphanilylurea. The salt crystallizes out of water under addition of potassium carbonate in the form of beautiful, long needles. By precipitation with acetic acid the free acetylsulphanilyl-urea may be obtained, which decomposes at a melting point of 185°–188ᵈ C.

Example 4

A similarly satisfactory yield of acetylsulphanilyl-urea may be obtained, if 50 gr. of acetylsulphanilamide, 50 gr. of nitrourea and 30 gr. of carbonate of soda are heated to the boiling point in 80% alcohol for 5–6 hours. After the alcohol has been boiled off, the mass is almost completely soluble in water and represents the sodium salt of the desired urea.

Example 5

| | Parts |
|---|---|
| Acetylsulphanilamide | 5 |
| Urea | 3 |
| Carbonate of soda | 2 |
| Alcohol | 15 |
| Water | 5 | are heated on a steam bath. Soon the sublimation of ammonium carbonate or carbamate sets in, and after about 10–12 hours the reaction is approximately half complete, as recognized from the portion which has been rendered water-soluble. Further heating fully completes the reaction. A solvent of a higher boiling point, like butylalcohol, may also be used, as well as other basic compounds, such as potassium hydroxide, potassium carbonate, sodium alcoholate, or a tertiary amine, the reaction thus being in some instances materially accelerated.

Similar results are obtained with urethanes, e. g. ethylurethane, the reaction being however slower than in the case of urea.

In all these cases, the acetylsulphanilylurea is obtained which decomposes after melting at 185°–188° C. When saponified with caustic soda solution or concentrated hydrochloric acid it yields the p-aminobenzene-sulphonyl-N-urea which decomposes at its melting point of 149°–154° C.

Example 6

20 gr. of acetylsulphanilamide and 12 gr. of phenylisocyanate are heated for an extended period of time to 100° C. The product of reaction is washed up in water, neutralized, while hot, by a sodium carbonate solution and, after cooling, sucked off from the insoluble sediment. Acetic acid precipitates from the filtrate a thick white deposit of the free urea derivative, which is preferably crystallized by way of the potassium salt from water with addition of sodium carbonate. The potassium salt forms beautiful needles, and from these we may obtain by means of acetic acid a good yield of the N-(acetylsulphanilyl)-N′-phenylurea.

Other isocyanic acid esters add in like manner, or even still more readily, to sulphamides to form N′-substituted N-sulphonylureas.

Example 7 p-Aminobenzenesulphonylcarbamide is produced as follows:

350 gr. of sulphanilamide, 178 gr. of potassium cyanate (technical) and 1050 cc. of denatured alcohol are boiled for 6 hours under reflux. As soon as the original mass has passed into solution, the potassium salt of the new compound starts crystallizing out until it finally forms a thick mass of crystals. The mass is sucked off while hot and again washed with the first named amount of hot 90% alcohol. Upon drying 470 gr. of crystal powder are obtained. These are stirred up with 550 cc. of cold water, and washed with 50 cc. of a saturated potassium carbonate solution. About 450 gr. of the potassium salt of the p-aminobenzenesulphonylcarbamide are obtained, i. e. 87% of the theoretical yield. The missing part is contained in the mother liquor in form of sulphanilamide and further heating with potassium cyanate will convert that part also to potassiumamino-sulphonylcarbamide. The potassium salt crystallizes from water in colorless flakes, which exhibit but moderate solubility in cold water, particularly so, when potassium salts or alcohol are added. Upon dissolution in four times the amount of hot water and addition of acetic acid, the free sulphonylcarbamide is precipitated in large needles, which contain 1 mol of crystal water.

The sodium salt is readily soluble in water and completely neutral in reaction. When boiled for some time in neutral, acid or alkaline solution, the compound is hydrolized into sulphanilamide. The free acid, which contains crystal water, decomposes under effervescence at about 125°–127° C.

Having thus given a careful outline of my invention in detail, yet I do not wish it to be limited thereby, except as the state of the art and the appended claims may require, for it is obvious that various modifications and changes may be made in the form of embodiment of my invention, without departing from the spirit and scope thereof.

What I claim is:

1. In the process of making p-aminobenzene sulphonylcarbamide, the step of boiling sulphanilamide with potassium cyanate and alcohol until the mass dissolves and the potassium salt of p-aminobenzene sulphonylcarbamide is obtained.

2. In the process of making p-aminobenzene sulphonylcarbamide, the step of boiling for about 6 hours approximately 2 parts of sulphanilamide and approximately 1 part of potassium cyanate in approximately 6 times as many cc. of denatured alcohol as there are parts of potassium cyanate until the mass dissolves and the potassium salt of potassium p-amino benzene sulphonylcarbamide is obtained.

ERICH HAACK.